United States Patent [10] Patent No.: US 10,461,437 B2
Durant et al. (45) Date of Patent: Oct. 29, 2019

(54) MULTI-LAYER ABSORBER

(71) Applicant: ARC Technologies LLC, Amesbury, MA (US)

(72) Inventors: Todd Durant, Hampstead, NH (US); Noel Bolduc, Hooksett, NH (US)

(73) Assignee: ARC Technologies LLC, Amesbury, MA (US)

( * ) Notice: Subject to any disclaimer, the term of this patent is extended or adjusted under 35 U.S.C. 154(b) by 149 days.

(21) Appl. No.: 15/372,176

(22) Filed: Dec. 7, 2016

(65) Prior Publication Data
US 2017/0093047 A1  Mar. 30, 2017

Related U.S. Application Data

(63) Continuation of application No. 14/079,119, filed on Nov. 13, 2013, now Pat. No. 9,541,678.

(51) Int. Cl.
*H01Q 17/00* (2006.01)
*B32B 27/18* (2006.01)
(Continued)

(52) U.S. Cl.
CPC .......... *H01Q 17/007* (2013.01); *B32B 27/18* (2013.01); *G02B 5/003* (2013.01); *H01Q 1/38* (2013.01);
(Continued)

(58) Field of Classification Search
CPC .... H01Q 17/00; H01Q 17/001; H01Q 17/007; H01Q 1/38; H01Q 1/526; B32B 17/10174; B32B 17/10201; B32B 17/10633
See application file for complete search history.

(56) References Cited

U.S. PATENT DOCUMENTS 3,114,839 A * 12/1963 Peters ............... G21F 1/125
250/515.1
3,551,017 A 12/1970 Iwasaki
(Continued)

FOREIGN PATENT DOCUMENTS

EP 0243162 A2 * 10/1987 ............. B32B 25/10
EP 0243162 A2 10/1987
(Continued)

OTHER PUBLICATIONS

Korean Office Action (with English translation) for corresponding KR Application No. 10-2016-7015698 dated April 27, 2017; 18 pages.
(Continued)

*Primary Examiner* — Frank J Vineis
*Assistant Examiner* — Alicia J Sawdon
(74) *Attorney, Agent, or Firm* — Nelson Mullins Riley & Scarborough LLP; Thomas J. Engellenner; Reza M. Mollaaghababa

(57) ABSTRACT

In one aspect, a multi-layer absorber is disclosed, which comprises a proximal layer having a radiation-receiving surface adapted for receiving electromagnetic radiation, and a distal layer disposed adjacent the proximal layer to receive at least a portion of the received radiation, if any, transmitted through said proximal layer, wherein said proximal layer exhibits an index of refraction having a real part that is less than the real part of an index of refraction of the said distal layer for at least one frequency of the electromagnetic radiation in a range of about 1 GHz to about 110 GHz.

13 Claims, 6 Drawing Sheets

(51) Int. Cl.
*G02B 5/00* (2006.01)
*H01Q 1/38* (2006.01)
*H01Q 1/52* (2006.01)

(52) U.S. Cl.
CPC ............ *H01Q 1/526* (2013.01); *H01Q 17/00* (2013.01); *H01Q 17/001* (2013.01); *B32B 2250/02* (2013.01); *B32B 2264/108* (2013.01); *Y10T 428/2495* (2015.01); *Y10T 428/24942* (2015.01); *Y10T 428/24967* (2015.01)

(56) References Cited

U.S. PATENT DOCUMENTS

| | | | |
|---|---|---|---|
| 4,003,840 | A | 1/1977 | Ishino et al. |
| 5,366,664 | A | 11/1994 | Varadan et al. |
| 5,488,371 | A | 1/1996 | Targove |
| 6,211,458 | B1 | 4/2001 | Mitchell et al. |
| 6,426,459 | B1 | 7/2002 | Mitchell |
| 6,610,922 | B1 | 8/2003 | Twiss et al. |
| 6,870,092 | B2 | 3/2005 | Lambert et al. |
| 6,954,309 | B2 | 10/2005 | Knobloch et al. |
| 7,038,124 | B1 | 5/2006 | Sosnowski |
| 7,280,009 | B2 | 10/2007 | Reynolds et al. |
| 7,492,610 | B2 | 2/2009 | Gilliland |
| 7,733,646 | B2 | 6/2010 | Hisatsune |
| 2003/0155143 | A1* | 8/2003 | Fujieda .................. B82Y 10/00 174/354 |
| 2003/0213606 | A1 | 11/2003 | Casper |
| 2006/0086520 | A1 | 4/2006 | Romano |
| 2006/0216485 | A1* | 9/2006 | Lin ........................ B32B 17/10 428/212 |
| 2016/0250688 | A1 | 9/2016 | Coppola |

FOREIGN PATENT DOCUMENTS

| | | |
|---|---|---|
| EP | 0742095 A2 | 11/1996 |
| EP | 0975207 A2 | 1/2000 |
| FR | 2795873 A1 | 1/2001 |
| JP | 09-162590 A | 6/1997 |
| JP | 2004502978 A | 1/2004 |
| JP | 2005158960 A | 6/2005 |
| JP | 2008-135485 A | 11/2006 |
| WO | 2014099187 A1 | 6/2014 |

OTHER PUBLICATIONS

Yang et al. (Nano Letters 2005 vol. 5, 2131-2134).
Yang et al. (Nanotechnology 2004 vol. 15, 1545-1548).
International Search Report and Written Opinion for PCT/US2013/073993, dated Jul. 18, 2014.
International Search Report and Written Opinion for PCT/US2016/046787, dated Nov. 11, 2016; 12 pages.
Japanese Office Action for corresponding JP Application 2016-554172 dated Sep. 27, 2017.

* cited by examiner

MULTI-LAYER ABSORBER

CROSS-RELATED APPLICATION

The present application is a continuation of U.S. patent application Ser. No. 14/079,119, filed, Nov. 13, 2013, which is incorporated herein by reference in its entirety.

BACKGROUND

The present teachings are generally directed to electromagnetic absorbers, and more particularly to multi-layer electromagnetic absorbers.

Electromagnetic absorbers find a variety of applications, such as shielding electronic equipment from electromagnetic interference or minimizing side-lobes in transmission and/or reception of electromagnetic signals by antennas. In many applications, it is desirable that an electromagnetic absorber exhibit not only a low reflectance but also a low transmission coefficient at one or more frequencies of interest. Many conventional electromagnetic absorbers are not, however, capable of exhibiting the desired reflectance and transmission coefficients.

Accordingly, there is a need for enhanced electromagnetic absorbers, and in particular, for electromagnetic absorbers that exhibit a low reflectance as well as a low transmission coefficient.

SUMMARY

In one aspect, a multi-layer electromagnetic absorber is disclosed, which comprises a proximal layer having a radiation-receiving surface adapted for receiving electromagnetic radiation, and a distal layer disposed adjacent the proximal layer to receive at least a portion of the received radiation, if any, transmitted through said proximal layer, wherein said proximal layer exhibits an index of refraction having a real part that is less than the real part of an index of refraction of said distal layer for at least one frequency of the electromagnetic radiation in a range of about 1 GHz to about 110 GHz. For example, the difference in the real parts of the indices of refraction of the proximal and distal layers can be in a range of about 3 to about 6.

In some embodiments, the real part of the index of refraction of the proximal layer is less than the real part of the index of refraction of the distal layer for at least one frequency in a range of about 20 GHz to about 80 GHz.

In some embodiments, the real part of the index of refraction of the proximal layer is less than the real part of the index of refraction of the distal layer for wavelengths over at least one frequency band within the frequency range of about 1 GHz to about 110 GHz. In some embodiments, the frequency band has a bandwidth of at least about 5 GHz, or at least about 10 GHz, or at least about 20 GHz, or at least about 50 GHz.

In some embodiments, in the above multi-layer absorber, the proximal layer exhibits an index of refraction having a real part that is less than the real part of an index of refraction of the said distal layer at frequencies of 24 GHz and/or 77 GHz.

In some embodiments, in the above multi-layer absorber, the real parts of the indices of refraction of the proximal and distal layers at said at least one frequency satisfy the following relation:

$$1 \leq (n_r^d - n_r^p)f \leq 20 \qquad \text{Equation (1)}$$

wherein,
$n_r^d$ denotes the real part of the index of refraction of the distal layer,
$n_r^p$ denotes the real part of the index of refraction of the proximal layer, and
f (in units of GHz (gigahertz)) denotes the frequency at which the difference in real parts of the indices of refraction of the proximal and distal layers is determined. In other words, the difference between the real parts of the indices of refraction of the proximal and the distal layers at a given frequency is in a range of about 1 to about 20 when multiplied by that frequency.

In some embodiments, the proximal and the distal layers comprise a polymeric material, e.g., thermoset elastomers, thermoplastic elastomers, liquid crystal polymers. By way of example, the polymeric material can be any of polyamide, polyester, polycarbonate, polypropylene, polystyrene (e.g., acrylonitrile butadiene styrene), polyurethane, epoxy, polyethylene, ethylene vinyl acetate, and silicone, among others.

In some embodiments, the above multi-layer absorber includes a plurality of radiation-absorbing additives distributed within at least one of its layers, wherein the additives are capable of absorbing electromagnetic energy at one or more frequencies in the range of about 1 GHz to about 110 GHz. By way of example, the radiation-absorbing additives can comprise a dielectric material, e.g., they can be in the form of particles having an average size less than about 500 microns.

In some embodiments, a volume fraction of the additives within one or more layers of the multi-layer absorber in which the additives are distributed can be equal to or less than about 50%. For example, the volume fraction of the additives can be in a range of about 1% to about 50%.

While in some embodiments the additives are distributed within only one layer, in other embodiments the additives can be distributed within a plurality of the layers of the multi-layer absorber, e.g., they can be distributed in all of the layers of the multi-layer absorber.

In some embodiments, the additives comprise a plurality of carbon particles. In some embodiments, the carbon particles can exhibit an average particle size that is less than about 500 micrometers.

In some embodiments of the multi-layer absorber, a concentration of the additives in the proximal layer is greater than a concentration of the additives in the distal layer. In some other embodiments, the concentration of the additives in the proximal layer is substantially the same as the concentration of the additives in the distal layer, and the proximal layer has a thickness greater than a thickness of the distal layer.

In some embodiments, the multi-layer absorber exhibits a reflectance coefficient that is equal to or less than about 0.3 for at least one incident radiation frequency in the range of about 1 GHz to about 110 GHz. For example, the reflectance coefficient can be in a range of 0 to about 0.3 for at least one incident radiation frequency in the range of about 1 GHz to about 110 GHz. By way of further example, in some embodiments, the multi-layer absorber can exhibit such a reflectance coefficient for both of the incident radiation frequencies of 24 GHz and 77 GHz.

In some embodiments, the multi-layer absorber exhibits a transmission coefficient that is equal to or less than about 0.3 for at least one incident radiation frequency in the range of about 1 GHz to about 110 GHz. For example, the transmission coefficient can be in a range of about 0 to about 0.3 for at least one incident radiation frequency in the range of about 1 GHz to about 110 GHz. By way of further example, in some embodiments, the multi-layer absorber can exhibit such a transmission coefficient for incident radiation frequencies of 24 GHz and 77 GHz.

In some embodiments, the thickness of each layer of the multi-layer absorber can be in a range of about 0.001 inches (0.0025 mm) to about 0.5 inches (12.7 mm). In some embodiments, the multi-layer absorber can have an overall thickness (i.e., the sum of the thicknesses of all the layers) in a range of about 0.002 inches (0.05 mm) to about 10 inches (254 mm).

In a related aspect, a multi-layer absorber is disclosed, which comprises a plurality of polymeric layers disposed relative to one another to form a polymeric stack having an input layer and an output layer such that the input layer includes a radiation-receiving surface for receiving incident electromagnetic radiation and the output layer includes an exit surface through which at least a portion of the received radiation, if any, exits the stack, wherein real dielectric constants of said polymeric layers for one or more frequencies, and in some cases for all frequencies, in a range of about 1 GHz to about 110 GHz progressively increase from said input layer to said output layer.

In some embodiments, the real dielectric constants of the polymeric layers for one or more frequencies progressively increase from the input layer to the output layer for one or more frequencies in a range of about 20 GHz to about 80 GHz In some embodiments, each of the layers of the multi-layer absorber exhibits a real dielectric constant in a range of about 0 to about 50, e.g., in a range of about 10-40, or 20-30, for at least one frequency in said range of about 1 GHz to about 110 GHz.

In a related aspect, a multi-layer absorber is disclosed, which comprises a proximal layer including a polymeric material and a first loading of a radiation absorbing additive, said proximal layer having a radiation-receiving surface for receiving electromagnetic radiation, and a distal layer disposed adjacent said proximal layer to receive at least a portion of the received radiation, if any, transmitted through said proximal layer, said distal layer comprising a second loading of a radiation-absorbing additive, wherein the real and imaginary parts of the dielectric constants of said layers are configured such that said absorber exhibits a reflectance coefficient equal to or less than about 0.3 and a transmission coefficient equal to or less than about 0.3 for incident radiation on said radiation-receiving surface of the proximal layer at one or more radiation frequencies in a range of about 1 GHz to about 100 GHz, e.g., for one or more frequencies in a range of about 20 GHz to about 80 GHz.

In some embodiments, the first loading of the additives (e.g. the volume fraction of the additives) is greater than the second loading of the additives. In some other embodiments, the first and second loadings are substantially the same and the proximal layer has a greater thickness than the distal layer.

In some embodiments, the real part of dielectric constant of the proximal layer is less than the respective real part of the dielectric constant of the distal layer. In some embodiments, the difference between the real parts of the dielectric constants of the proximal and distal layers is in a range of about 3 to about 6.

Further understanding of various aspects of the invention can be obtained by reference to the following detailed description in conjunction with the accompanying drawings, which are described briefly below.

DETAILED DESCRIPTION

Figure 1:
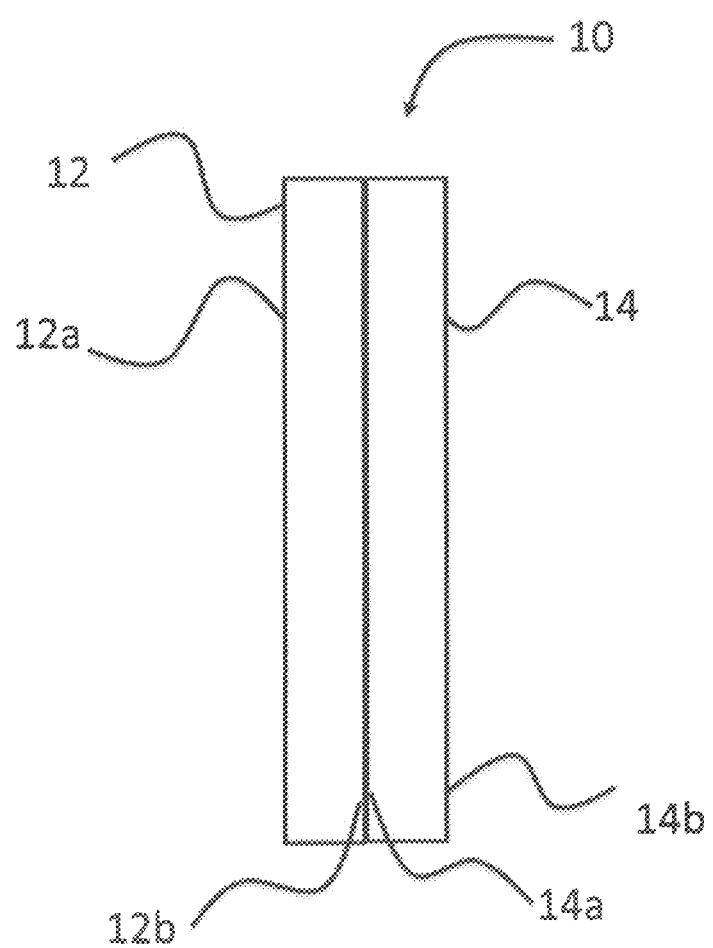
FIG. 1 schematically depicts a multi-layer electromagnetic absorber according to an embodiment of the present invention, FIG. 2 schematically depicts a frequency band with a bandwidth of 10 GHz disposed in a frequency range between 1 GHz and 110 GHz FIG. 3 schematically depicts examples of reflection and transmission of radiation incident on a multi-layer absorber according to the present teachings at various surfaces thereof, FIG. 4 schematically depicts a multi-layer absorber according to another embodiment of the present invention having a proximal layer and a distal layer and a plurality of radiation-absorbing additives distributed within those layers, FIG. 5 schematically depicts a multi-layer absorber according to another embodiment having four polymeric layers disposed side-by-side to form a polymeric stack, and FIG. 6 schematically depicts a multi-layer absorber according to another embodiment having four polymeric layers disposed side-by-side to form a polymeric stack, where a plurality of radiation-absorbing additives are distributed in each layer.

The present teachings are generally directed to multi-layer electromagnetic absorbers that include two or more material layers with different indices of refraction configured such that the multi-layer absorber exhibits a low reflectance coefficient as well as a low transmission coefficient for one or more frequencies in a range of about 1 GHz to about 110 GHz. As discussed in more detail below, in some embodiments, the real part of the index of refraction of the layers forming the multi-layer absorber progressively increases from a proximal layer, which is configured to receive electromagnetic radiation, to a distal layer through which a portion of the received electromagnetic radiation, if any, that has traversed through the layers exits the multi-layer absorber. Various aspects of the present invention are discussed in more detail below. The following definitions are provided for a variety of terms and phrases utilized herein.

The term "index of refraction" of a medium at a frequency (f) is used herein consistent with its meaning in the art and is defined as a complex number whose real part (herein also referred to as the refractive index) is a ratio of the speed of electromagnetic radiation in vacuum relative to the speed of radiation at that frequency in the medium and whose imaginary part is indicative of the absorption of radiation at that frequency by the medium as the radiation passes therethrough. More particularly, the index of refraction of a medium (e.g., one of the layers of the multi-layer absorber) at a frequency (f) can be defined as follows $$n(f)=n_r(f)+i\, n_i(f) \qquad \text{Equation (2)}$$

wherein, n(f) denotes the index of refraction at frequency (f), $n_r(f)$ denotes the real part of the index of refraction at frequency (f) (herein also referred to as the real index of refraction), $n_i(f)$ denotes the imaginary part of the index of refraction at frequency (f) (herein also referred to as the imaginary index of refraction), and $i=\sqrt{-1}$.

The real part of the index of refraction n(f) can be defined as the ratio of the speed of light (c) in vacuum relative to the speed of light in the medium (v):

$$n(f) = \frac{c}{v} \qquad \text{Equation (3)}$$

The imaginary part of the index of refraction ($n_i(f)$) of a medium can be defined based on the attenuation of the intensity of electromagnetic radiation having a frequency (f) passing through a length (z) of the medium in accordance with the following relation:

$$I_z = I_0 e^{-\frac{\pi n_i(f)}{\lambda_0}} \qquad \text{Equation (4)}$$

wherein,
$I_0$ denotes the initial intensity of the electromagnetic radiation,
$I_z$ denotes the intensity of the electromagnetic radiation after passage through a length (z) of the medium, and
$\lambda_0$ denotes the wavelength of the radiation with frequency (f) in vacuum.

The term "dielectric constant" of a medium is also used herein consistent with its ordinary meaning in the art to refer to a complex number that is related to the complex index of refraction of the medium in accordance with the following relation:

$$\varepsilon = \varepsilon_r + i\, \varepsilon_i = (n_r + i n_i)^2 \qquad \text{Equation (5)}$$

wherein,
$\varepsilon$ denotes the complex dielectric constant,
$\varepsilon_r$ denotes the real part of the dielectric constant (herein also referred to as the real dielectric constant),
$\varepsilon_i$ denotes the imaginary part of the dielectric constant (herein also referred to as the imaginary dielectric constant), and
$n_r$ and $n_i$ are the real and imaginary parts of the index of refraction as defined above.

The term "reflectance coefficient," e.g., as it relates to the reflection of radiation incident on a surface forming a boundary between two regions having different indices of refraction, is used herein consistent with its meaning in the art and can be defined as the ratio of the intensity of light reflected at a boundary surface relative to the intensity of the radiation incident on that surface in accordance with the following relation:

$$\alpha = \frac{I_r}{I_0} \qquad \text{Equation (6)}$$

wherein,
$\alpha$ denotes the reflectance coefficient,
$I_0$ denotes the intensity of the incident radiation, and
$I_r$ denotes the intensity of portion of the incident radiation that is reflected.

The term "transmission coefficient" of a material, e.g., a multi-layer absorber according to the present teachings, is used herein consistent with its meaning in the art and can be defined as the ratio of the intensity of light transmitted through the material relative to the intensity of the light incident on a radiation-receiving surface of the material in accordance with the following relation:

$$\beta = \frac{I_t}{I_0} \qquad \text{Equation (7)}$$

wherein,
$\beta$ denotes the transmission coefficient,
$I_0$ denotes the intensity of the incident radiation, and
$I_t$ denotes the intensity of the portion of the incident radiation that is transmitted.

As understood in the art, the index of refraction of a material is generally frequency dependent. Further, in some cases, the index of refraction can be a tensor quantity whose value varies depending on the direction of propagation of the radiation in the material. To the extent that in some embodiments the index of refraction may be a tensor quantity, the relation discussed below refer to the values of the index of refraction and the dielectric constant along the direction of propagation of radiation.

The term "frequency band" as used herein refers to a continuous range of frequencies between a lower limiting frequency ($f_{lower}$) and an upper limiting frequency ($f_{upper}$), and wherein the bandwidth of a frequency band is defined as:

$$\text{Bandwidth} = f_{upper} - f_{lower} \qquad \text{Equation (8)}$$

Figure 2:

By way of further illustration, FIG. 2 schematically depicts a frequency band (A) ranging from 20 GHz to 30 GHz having a bandwidth of 10 GHz.

The terms "about" and "approximately" are used herein interchangeably and are intended to cover variations within +/−10%, or +/−5% of a stated numerical value.

FIG. 1 schematically depicts a multi-layer absorber 10 according to an embodiment of the present teachings that includes a proximal layer 12 and a distal layer 14. The proximal layer 12 includes an input surface 12a configured to receive incident electromagnetic energy (radiation), and an output surface 12b, which is in contact with an input surface 14a of the distal layer. The distal layer 14 includes an output surface 14b through which a portion, if any, of the incident electromagnetic energy transmitted through the layers 12 and 14 exits the absorber 10. As discussed in more detail below, in this embodiment, each of the proximal and the distal layers is formed of a polymeric material, though in other embodiments other types of materials can be employed.

As discussed in more detail below, in this embodiment, the multi-layer absorber 10 exhibits both a low reflectance coefficient and a low transmission coefficient for one or more radiation frequencies within a selected range, e.g., in a range of about 1 GHz to about 110 GHz. By way of example, in some implementations, the multi-layer absorber 10 exhibits a reflectance coefficient equal to or less than about 0.3 and a transmission coefficient equal to or less than about 0.3 for at least one frequency in the range of about 1 GHz to about 110 GHz, e.g., in a range of about 20 GHz to about 80 GHz. In some embodiments, the multi-layer absorber 10 exhibits such low reflectance and transmission coefficients for all frequencies within a frequency band, e.g., a frequency band lying the range of about 1 GHz to about 110 GHz. For example, the multi-layer absorber 10 can exhibit such low reflectance and transmission coefficients over at least one frequency band having a bandwidth in a range of about 5 GHz to about 50 GHz, where the frequency band lies in the frequency range of about 1 GHz to about 110 GHz, e.g., the frequency band A depicted in FIG. 2. In some cases, the multi-layer absorber 10 can exhibit such low reflectance and transmission coefficients at a plurality of discrete frequencies within the range of about 20 GHz to about 110 GHz, e.g., at frequencies of 26 GHz and 77 GHz.

By way of example, in this embodiment, the indices of refraction of the proximal layer 12 and the distal layer 14 are configured so as to achieve a reflectance coefficient equal to or less than about 0.3 and a transmission coefficient equal to or less than about 0.3 for one or more wavelengths in the range of about 1 GHz to about 110 GHz. More specifically, in this embodiment, the proximal layer 12 exhibits an index of refraction whose real part is less than the real part of the index of refraction of the distal layer 14. In some such embodiments, the real parts of the indices of refraction of the proximal and distal layers satisfy the relation of the above Equation (1) for one or more frequencies (f) in the range of about 1 GHz to about 110 GHz, e.g., in the range of about 20 GHz to about 80 GHz.

Further, in this embodiment, the imaginary parts of the indices of refraction of the proximal and distal layers are configured so as to minimize the transmission of the radiation entering the multi-layer absorber through its radiation-receiving surface. In other words, the imaginary parts of the indices of refraction of the two layers are configured to enhance absorption of the portion of the incident electromagnetic energy that has entered the absorber via refraction at the input surface 12a as it propagates through the absorber, thereby minimizing the amount of electromagnetic energy exiting the absorber through the output surface 14b of the distal layer 14. As discussed in more detail below, in some embodiments, a plurality of radiation absorbing particles are distributed within at least one, and preferably both, of the proximal and distal layers in order to enhance radiation absorption as the radiation propagates through the multi-layer absorber 10.

In some embodiments, the difference between the real parts of the indices of refraction of the proximal and distal layers 12 and 14, together with the thickness of the proximal layer, can be selected so as to ensure that the multi-layer absorber exhibits a low reflectance coefficient, e.g., a reflectance coefficient equal to or less than about 0.3 for at least one frequency, and preferably for a plurality of frequencies, in the range of about 1 GHz to about 110 GHz. For example, the difference in the real parts of the indices of refraction of the proximal and distal layers can satisfy the above Equation (1). Further, the thickness of the proximal layer can be selected so as to satisfy the following relation:

$$2t = \left(p + \frac{1}{2}\right)\lambda \qquad \text{Equation (9)}$$

wherein,
t refers to the thickness of the proximal layer,
p is an integer, and
$\lambda$ is the wavelength of the radiation within the proximal layer.

Figure 3:
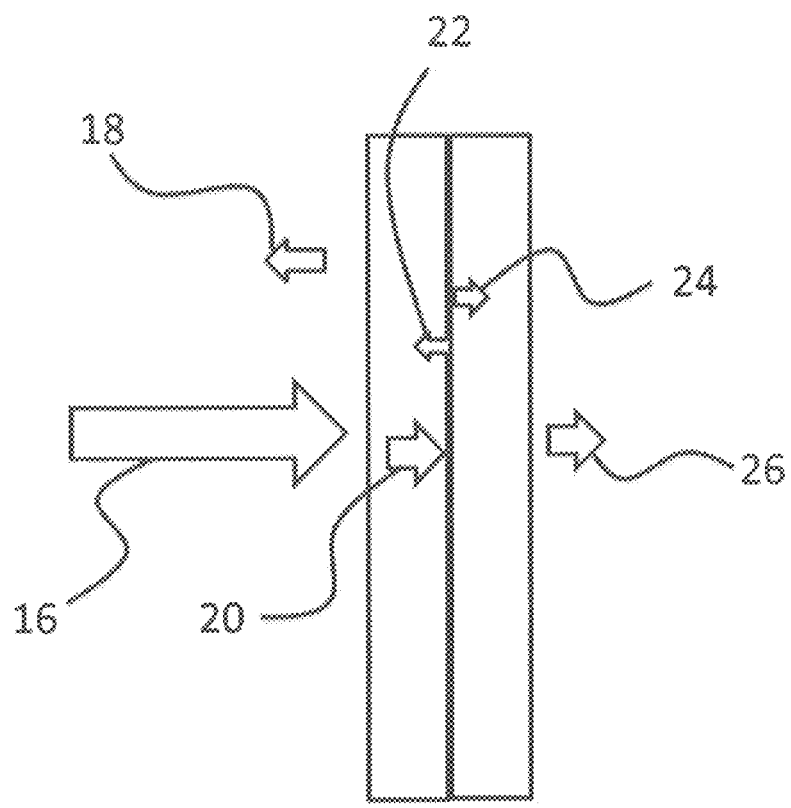

With reference to FIG. 3 and without being limited to any particular theory, in some embodiments, as the incident electromagnetic radiation (schematically depicted by arrow 16) strikes the input surface 12a, a portion of it is reflected at that surface (schematically depicted by arrow 18) and another portion enters the proximal layer (schematically depicted by arrow 20) to propagate to the interface between the proximal and distal layers, where a portion of the radiation is reflected back at that interface (schematically depicted by arrow 22) toward the input surface 12a, due to a difference between the indices of refraction of the proximal and distal layers, and another portion of the radiation (schematically depicted by arrow 24) enters the distal layer 14 via refraction at the interface between the proximal and the distal layers. The radiation then propagates through the distal layer 14 and a portion thereof, if any, exits the multi-layer absorber 10 through the output surface 14b (schematically depicted as arrow 26). As this analysis is provided for illustrative purposes, the higher order reflections are neglected.

The thickness of the proximal layer can be selected (e.g., in accordance with Equation (9) above) such that the back reflected radiation 18, or at least a substantial portion thereof (e.g., at least 80%, or at least 90%), would interfere destructively with the radiation 22 reflected at the interface of the proximal layer 12 and the distal layer 14 so as to minimize the reflectance coefficient of the multi-layer absorber 10. For example, the thickness of the proximal layer can be selected so that the round trip optical path of the radiation through that layer (i.e., the path from the input surface 12a to the interface between the proximal and distal layers and back from that interface to the input surface 12a) is an integer multiple of the half wavelength of the radiation through that layer. In some implementations, the difference between the indices of refraction of the proximal and distal layers is selected to enhance this destructive interference for at least one frequency in the range of about 1 GHz to about 110 GHz. For example, as noted above, the indices of refraction of the two layers can satisfy the above Equation (1).

In addition, the proximal and distal layers are configured to enhance absorption of the portion of the electromagnetic radiation that enters the multi-layer absorber via refraction at the input surface 12a of the proximal layer 12. By way of example, in some embodiments, one or both of the proximal and distal layers can include radiation-absorbing additives distributed therein so as to increase the absorption of the radiation passing through the layers.

The imaginary part of the index of refraction of each layer at a given frequency is indicative of the level of radiation absorption that the layer provides at that frequency. The concentration of the radiation-absorbing additives can be selected so as to modulate the imaginary part of the index of refraction of the layer in which the additives are distributed in order to obtain a desired value for the imaginary index of refraction. For example, in some embodiments, the concentration of the radiation-absorbing additives distributed within the proximal and/or the distal layers is selected such that the multi-layer absorber would exhibit a transmission coefficient equal to or less than about 0.3. In general, as the concentration of the radiation absorbing additives within a layer increases so does the magnitude of the imaginary index of refraction of that layer.

By way of example, in some implementations, the volume fraction of the radiation-absorbing additives distributed in each of the proximal and distal layers (i.e., the ratio of the volume occupied by the additives relative to the volume of the respective layer) can be less than about 50%, e.g., in a range of about 1% to about 50%.

Figure 4:
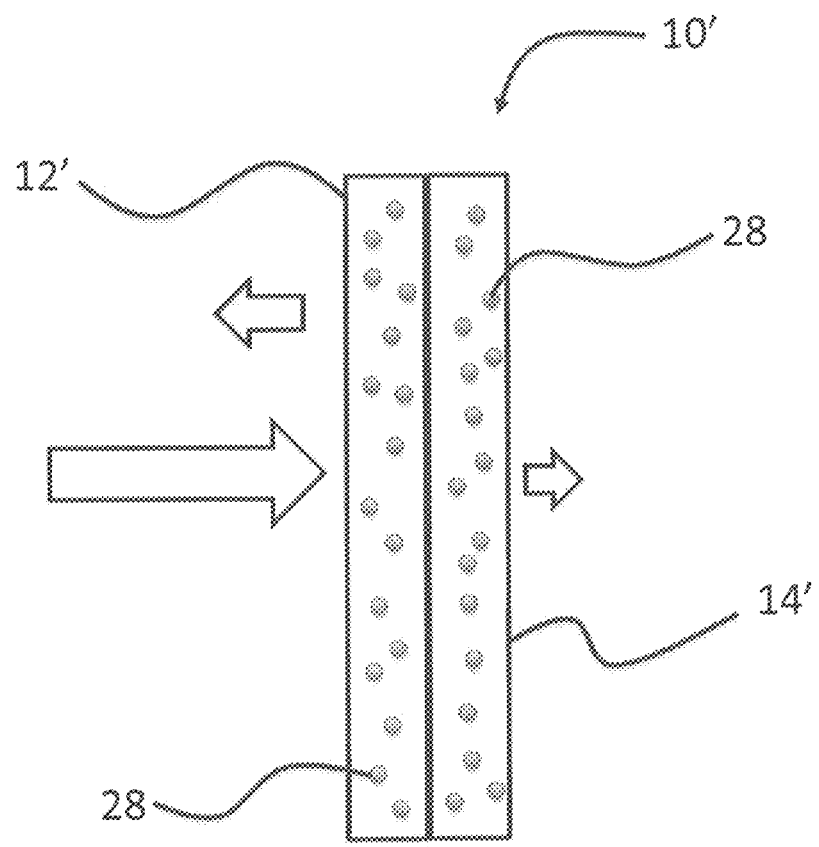

For example, FIG. 4 schematically depicts one such embodiment of a multi-layer absorber 10' according to the present teachings that includes a proximal layer 12' and a distal layer 14'. A plurality of radiation-absorbing additives 28 in the form of carbon particles are distributed within each of the proximal layer 12' and the distal layer 14'. The carbon particles enhance the absorption of radiation in a range of about 1 GHz to about 110 GHz passing through the layers 10' and 12'. In some embodiments, the carbon particles can exhibit an average size (e.g., an average of the particle's size in three orthogonal dimensions (X, Y, and Z)) of less than about 500 micrometers, or less than about 250 micrometers.

For example, the multi-layer absorber 10' can exhibit a transmission coefficient that is less than about 0.3, e.g., in a range of about 0 to about 0.3, for one or more frequencies in the range of about 1 GHz to about 110 GHz.

Although each of the above exemplary multi-layer absorbers 10/10' includes two layers (i.e., the proximal layers 12/12' and the distal layers 14/14'), a multi-layer absorber according to the present teachings can include 3 or more layers. In some embodiments, the number of layers of a multi-layer absorber can be, e.g., in a range of 2 to 20, or in a range of 2 to 15, or in a range of 2 to 10, or in a range of 5 to 10.

Figure 5:
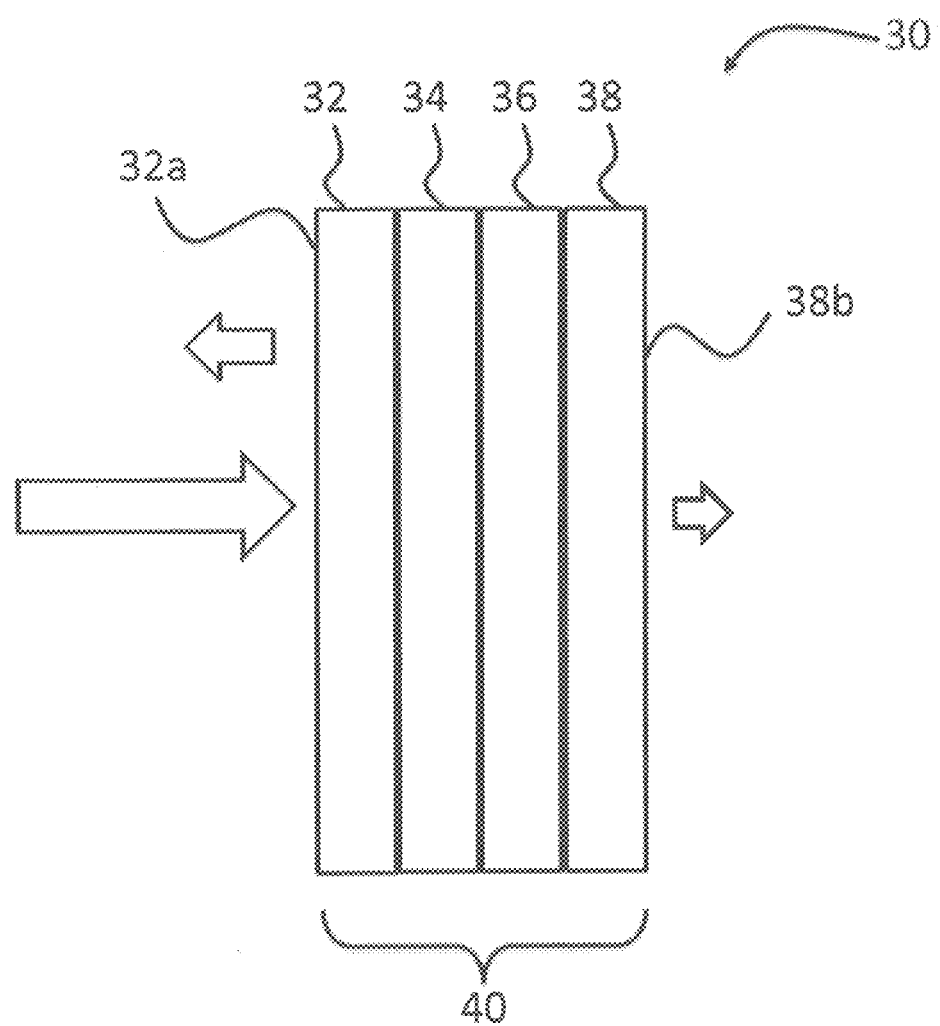

By way of example, FIG. 5 schematically depicts a multi-layer absorber 30 according to another embodiment, which includes four polymeric layers 32, 34, 36, and 38 disposed side-by-side relative to one another to form a polymeric stack 40. In this embodiment, the layer 32 functions as an input layer for receiving radiation via its input surface 32a, and the layer 38 functions as an output layer having an output surface 38b through which at least a portion of the radiation incident on the input surface 32a that has penetrated the multi-layer absorber and has not been absorbed during propagation through the absorber exits the polymeric stack 40.

In this embodiment, the real dielectric constants of the polymeric layers 32, 34, 36 and 38 for one or more frequencies in a range of about 1 GHz to about 110 GHz progressively increase from the input layer 32 to the output layer 38. In other words, each layer has a real dielectric constant that is greater than that of a previous layer. The increase of the real dielectric constants of the layers can be in accordance with a variety of functional forms. For example, in some embodiments, the real dielectric constants of the layers increase linearly from the input layer 32 to the output layer 38 while in other embodiments the increase can be non-linear. In some embodiments, the real dielectric constants of any two adjacent layers satisfy the above relation of Equation (1) at a selected frequency in the range of about 1 GHz to about 110 GHz, wherein the proximal layer corresponds to the light input layer or a layer that is closer to the light input layer and the distal layer corresponds to the light output layer or a layer that is closer to the light output layer.

By way of example, in some embodiments, the layers are formed of different polymeric materials having different real dielectric constants such that the real dielectric constants increase progressively from the input layer to the output layer. Similar to the previous embodiment, a variety of polymeric materials can be employed to form the layers 32, 34, 36 and 38, such as those listed above.

Figure 6:
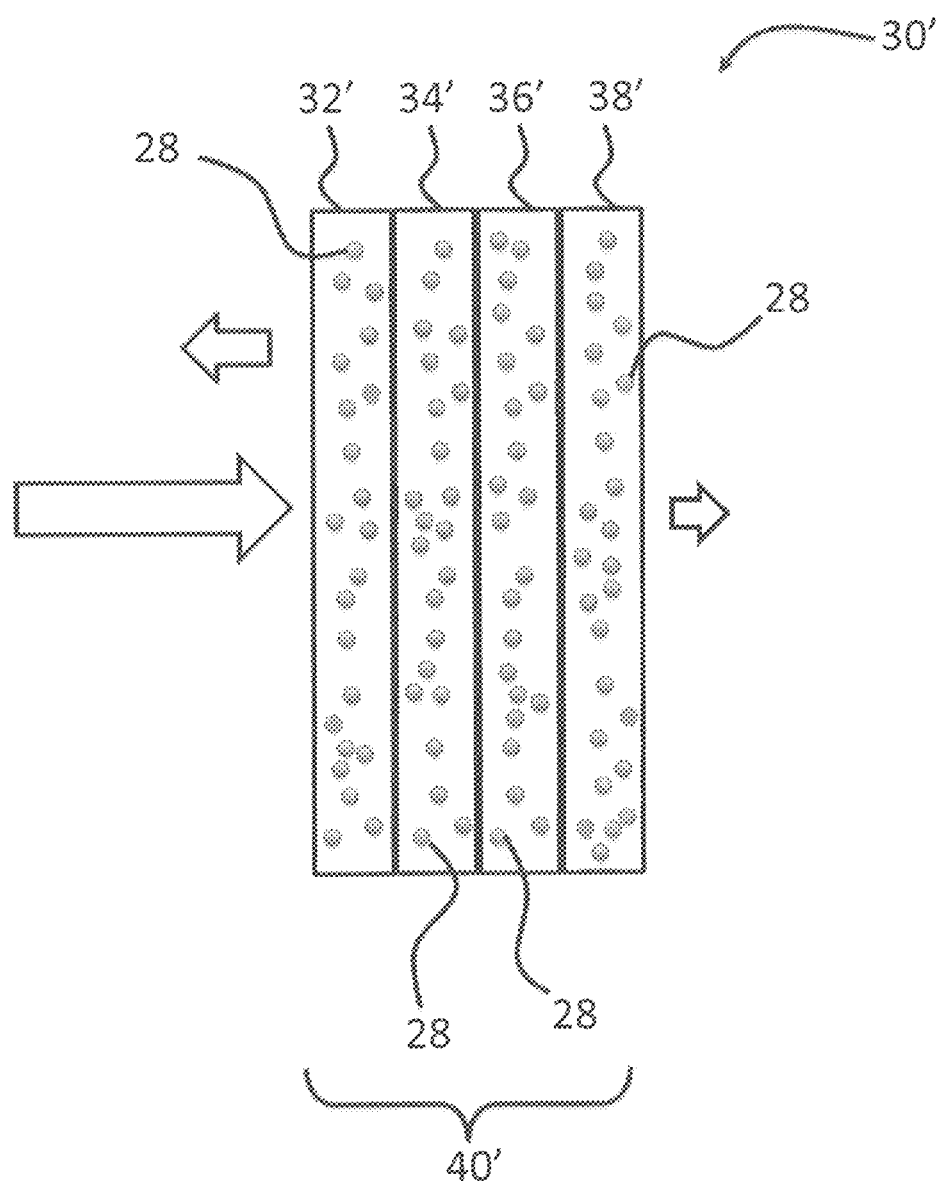

In some embodiments, one or more of the layers 32, 34, 36 and 38 can include a plurality of radiation absorbing additives distributed therein. By way of example, FIG. 6 schematically shows a multi-layer absorber 30' according to an embodiment of the present teachings that similar to the above multi-layer absorber 30 includes four polymeric layers 32', 34', 36' and 38' disposed side-by-side to form a polymeric stack 40', where the layers exhibit an increasing real dielectric constant from the input layer 32' to the output layer 38'.

A plurality of radiation-absorbing additives 28, e.g., carbon particles, are distributed within each of the layers 32', 34', 36' and 38'. As in the previous embodiment, the additives 28 can have an average size less than about 500 micrometers and a fractional volume in a range of about 1% to about 50%, e.g., in a range of about 10% to about 40%, or in a range about 15% to about 30%.

While in some implementations, the concentration of the radiation-absorbing additives (e.g., volume fraction) in each of the polymeric layers 32', 34', 36' and 38' can be the same as the concentration of the radiation-absorbing additives distributed in any of the other layers, in other implementations, at least two of the layers 32', 34', 36' and 38' can have different concentrations (e.g., volume fractions) of the additives 28.

In some embodiments, the multi-layer absorber 30' can exhibit a reflectance coefficient equal to or less than about 0.3, e.g., in a range of about 0 to about 0.3, and a transmission coefficient equal to or less than about 0.3, e.g., in a range of about 0 to about 0.3.

Multi-layer absorbers according to the present teachings can be formed by employing a variety of manufacturing techniques. For example, in some embodiment, fillers can be added to a polymer using known mixing methods and apparatuses. By way of example, continuous mixers, internal mixers, planetary mixers and twin-screw extruders can be used for this purpose. Once the filler is blended with the polymer, polymeric sheets can be formed by various methods including extrusion, calendering, casting or pressing. A multilayer sheet according to the above teachings can then be formed by bonding individual sheet layers using any appropriate adhesive. In some embodiments, a multi-layer sheet according to the above teachings can be formed in a single process, such as coextrusion and co-curing of a plurality of polymeric sheets.

The multi-layer absorbers according to the present teachings can find a variety of applications. For example, such multi-layer absorbers are particularly suited for use in electromagnetic shielding applications in which not only a high absorption of the electromagnetic radiation but also a low reflectance of the incident radiation on the shield is desired. For example, the multi-layer absorbers according to the present teachings can be utilized in automotive applications to absorb stray radiation, e.g., in a collision avoidance radar system. In other applications, the multi-layer absorbers according to the present teachings can be utilized for shielding electronic equipment, such as servers, from external interfering electromagnetic radiation. Examples of other applications in which multi-layer absorbers according to the present teachings can be employed include reducing electromagnetic emissions from an electronic enclosure and/or eliminating problems associated with electromagnetic interference within an electronic enclosure, reducing radar signature of unwanted objects in and near testing facilities, and improving antenna performance.

Those having ordinary skill in the art will appreciate it that various changes can be made to the above embodiments without departing from the scope of the invention.

What is claimed is:

1. A multi-layer absorber, comprising:
a plurality of polymeric layers disposed relative to one another to form a polymeric stack having an input layer and an output layer such that said input layer includes a radiation-receiving surface for receiving incident electromagnetic radiation and said output layer includes an exit surface through which at least a portion of the received radiation, if any, exits the stack, wherein the number of the plurality of polymeric layers is greater than 2 and equal to or less than 20,
a plurality of radiation-absorbing additives distributed within at least one of said plurality of polymeric layers, wherein a concentration of the plurality of radiation-absorbing additives is greater in said input layer relative to a concentration of said radiation-absorbing additives in said output layer, wherein said plurality of radiation-absorbing additives is capable of absorbing electromagnetic energy at one or more frequencies in a range of about 1 GHz to about 110 GHz, wherein the real dielectric constants of said polymeric layers progressively increase from the input layer to the output layer for one or more frequencies in a range of about 1 GHz to about 110 GHz, and wherein the absorber exhibits a coefficient of reflection equal to or less than about 0.3 and a coefficient of transmission equal to or less than about 0.3 for at least one incident radiation frequency in the range of about 1 GHz to about 110 GHz.

2. The multi-layer absorber of claim 1, wherein each of said layers exhibits a real dielectric constant in a range of about 0 to about 50 for at least one frequency in said range of about 1 GHz to about 110 GHz.

3. The multi-layer absorber of claim 2, wherein said at least one frequency is any of 24 GHz and 77 GHz.

4. The multi-layer absorber of claim 1, wherein said real dielectric constants of said polymeric layers progressively increase from said input layer to said output layer for frequencies within a frequency band in a range of about 20 GHz to about 80 GHz.

5. The multi-layer absorber of claim 4, wherein said frequency band has a bandwidth of at least about 20 GHz.

6. The multi-layer absorber of claim 4, wherein said frequency band has a bandwidth of at least about 50 GHz.

7. The multi-layer absorber of claim 4, wherein said absorbing additives are formed of a material exhibiting a coefficient of absorption greater than about 0.5 for at least one frequency in the range of about 20 GHz to about 100 GHz.

8. The multi-layer absorber of claim 1, wherein said additives comprise a plurality of carbon particles.

9. The multi-layer absorber of claim 1, wherein said radiation-absorbing additives are distributed within each of said polymeric layers.

10. The multi-layer absorber of claim 1, wherein a volume fraction of said radiation-absorbing additives in at least one of said layers is in a range of about 1% to about 50%.

11. The multi-layer absorber of claim 1, wherein the plurality of polymeric layers comprises different polymeric materials.

12. The multi-layer absorber of claim 11, wherein the polymeric materials are selected from the group consisting of thermoset elastomers, thermoplastic elastomers, liquid crystal polymers, polyamide, polyester, polycarbonate, polypropylene, polystyrene, acrylonitrile butadiene styrene, polyurethane, epoxy, polyethylene, ethylene vinyl acetate, and silicone.

13. The multi-layer absorber of claim 12, wherein a thickness of the input layer is greater than a thickness of the output layer.

* * * * *